No. 641,786. Patented Jan. 23, 1900.
H. C. MARTELL.
VEHICLE SPRING.
(Application filed June 17, 1899.)
(No Model.)
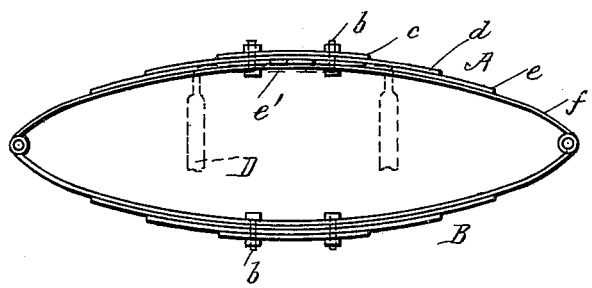
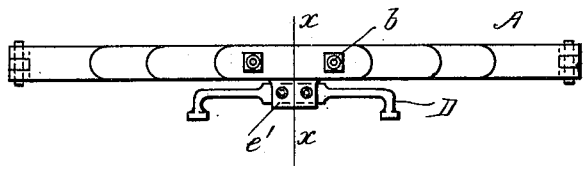
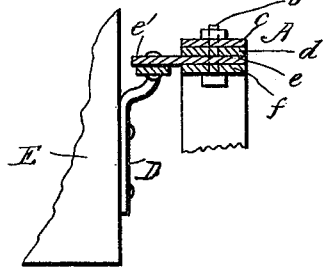 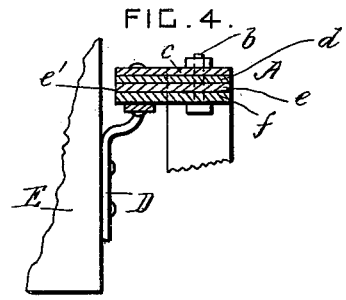
WITNESSES
INVENTOR
Herbert C. Martell.
by Herbert W. T. Jenner.
Attorney

UNITED STATES PATENT OFFICE.

HERBERT C. MARTELL, OF COLUMBUS, OHIO.

VEHICLE-SPRING.

SPECIFICATION forming part of Letters Patent No. 641,786, dated January 23, 1900.

Application filed June 17, 1899. Serial No. 720,969. (No model.)

*To all whom it may concern:*

Be it known that I, HERBERT C. MARTELL, a citizen of the United States, residing at Columbus, in the county of Franklin and State of Ohio, have invented certain new and useful Improvements in Vehicle-Springs; and I do hereby declare the following to be a full, clear, and exact description of the invention, such as will enable others skilled in the art to which it appertains to make and use the same.

This invention relates to elliptical leaf-springs for supporting the bodies of vehicles; and it consists in the novel construction and combination of the parts hereinafter fully described and claimed.

In the drawings, Figure 1 is a side view of a vehicle-spring constructed according to this invention. Fig. 2 is a plan view of the same. Fig. 3 is a cross-section taken on the line $xx$ in Fig. 2. Fig. 4 is a similar cross-section showing a modification.

A is the upper section of an elliptical leaf-spring, and B is the lower section of the same. The ends of the two sections are pivotally connected together in any approved manner. Each spring-section consists of one or more leaves, and when a series of leaves are used the leaves are arranged one above the other and have their middle portions connected together in any approved manner, as by bolts $b$.

The drawings show a series of four leaves $c\ d\ e\ f$, and in order to provide a means for connecting the hanger which supports the carriage-body to the spring in a position permitting the hanger to be arranged between the spring and the carriage-body one of the leaves of the spring is provided with a lug $e'$, which projects laterally from it at about the middle of its length and in the plane of the leaf. When four spring-leaves are used, the lug $e'$ is preferably formed integral with or is welded to the third leaf from the top, so that it projects laterally from between the leaves $d$ and $f$.

D is a portion of the hanger, and E is a portion of the vehicle-body. The hanger is secured to the vehicle-body and to the lug $e'$ in any approved manner, and the hanger is arranged between the spring and the vehicle-body.

In the modification shown in Fig. 4 each leaf of the spring is provided with a similar projecting lug and the hanger is bolted to all the said lugs.

What I claim is—

1. A vehicle leaf-spring provided with a lug which projects laterally from its middle part in the plane of the leaf and affords an attachment for the body-hanger, substantially as set forth.

2. A vehicle leaf-spring comprising a series of superposed leaves operatively connected together, each said leaf being provided with a lug which projects laterally from its middle part, said lugs forming an attachment for the body-hanger, substantially as set forth.

3. A vehicle leaf-spring comprising a series of superposed leaves operatively connected together, one of the inner leaves of the series being provided with a lug which projects laterally from its middle part and from between the two next adjacent leaves, said lug forming an attachment for the body-hanger, substantially as set forth.

4. The combination, with a vehicle leaf-spring provided with a lug which projects laterally from its middle part in the plane of the leaf, of a body-hanger secured to the said lug and arranged between the spring and the vehicle-body, substantially as set forth.

In testimony whereof I affix my signature in presence of two witnesses.

HERBERT C. MARTELL.

Witnesses:
    ED. L. POLLOCK,
    IDA PHILBRICK.